United States Patent
Thanganathan et al.

(10) Patent No.: US 12,211,078 B2
(45) Date of Patent: *Jan. 28, 2025

(54) METHODS AND SYSTEMS FOR SYNCHRONIZATION IN A CLOUD MARKETPLACE

(71) Applicant: Zoho Corporation Private Limited, Kanchipuram District (IN)

(72) Inventors: Sathish Kumar Thanganathan, Kanchipuram District (IN); Gowthaman Ramureddy, Kanchipuram District (IN); Praseetha Navaneethan, Kanchipuram District (IN); Priyadharshini S, Kanchipuram District (IN)

(73) Assignee: Zoho Corporation Private Limited, Kanchipuram District (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/482,390

(22) Filed: Oct. 6, 2023

(65) Prior Publication Data
US 2024/0037624 A1 Feb. 1, 2024

Related U.S. Application Data

(63) Continuation of application No. 17/365,144, filed on Jul. 1, 2021, now Pat. No. 11,783,398.
(Continued)

(30) Foreign Application Priority Data

Aug. 5, 2020 (IN) .............................. 202041033562

(51) Int. Cl.
*G06Q 30/00* (2023.01)
*G06F 9/50* (2006.01)
(Continued)

(52) U.S. Cl.
CPC ....... *G06Q 30/0623* (2013.01); *G06F 9/5005* (2013.01); *G06F 16/252* (2019.01); *G06Q 30/0282* (2013.01)

(58) Field of Classification Search
CPC ............ G06Q 30/0623; G06Q 30/0282; G06F 16/252; G06F 9/5005
See application file for complete search history.

(56) References Cited

U.S. PATENT DOCUMENTS 9,501,762 B2  11/2016 Babenko et al.
9,805,402 B1  10/2017 Maurer et al.
(Continued)

OTHER PUBLICATIONS

NPL, Cloud Future of Web, Says Shopify Exec., Kerry Murdock, May 5, 2011 (Year; 2011). 5 pages.
(Continued)

*Primary Examiner* — Ethan D Civan
(74) *Attorney, Agent, or Firm* — Silicon Edge Law Group LLP; Arthur J. Behiel (57) ABSTRACT

A cloud marketplace includes a network of data centers that collectively allow users to search for and purchase products, including applications and extensions to applications. Each data center supports a marketplace module that executes on computing resources to offer users the products and receive and send product metadata descriptive of the products. The marketplace module in each data center, on receiving user feedback related to one of the products, updates the product metadata with the user feedback, and updates a database in the data center using database management system protocols. The marketplace module also passes the user feedback to an agent module within the data center that is separate from the database management system. The agent module passes the user feedback to agent modules of other data centers so that the user feedback can be synchronized across
(Continued)

data centers before the database management systems of the data centers synchronize with each other.

20 Claims, 13 Drawing Sheets

Related U.S. Application Data (60) Provisional application No. 63/081,254, filed on Sep. 21, 2020.

(51) Int. Cl.
*G06F 16/25* (2019.01)
*G06Q 30/0282* (2023.01)
*G06Q 30/0601* (2023.01)

(56) References Cited

U.S. PATENT DOCUMENTS

| 11,783,398 | B2* | 10/2023 | Thanganathan ... | G06Q 30/0623 705/26.61 |
|---|---|---|---|---|
| 2010/0217654 | A1* | 8/2010 | Keller ............... | G06Q 30/0218 705/14.2 |
| 2012/0102050 | A1 | 4/2012 | Button et al. | |
| 2018/0053163 | A1 | 2/2018 | Khanani | |
| 2018/0260409 | A1* | 9/2018 | Sundar ............ | G06F 16/13 |

OTHER PUBLICATIONS

Opportunities and Advantages of Cloud Technologies for Ecommerce, Nicholas Fincher, May 6, 2014 (Year: 2014). 6 pages.

Tolson, "Data Sovereignty and the GDPR; Do You Know Where Your Data Is?," Archive 360, downloaded from https://www.archive360.com/blog/data-sovereignty-and-the-gdpr-do-you-know-where-your-data-is on Jun. 10, 2021 but dated Feb. 14, 2019, 10 pages.

Lokhande, "Administering Oracle Access Management, Ch. 19, Synchronizing Data in A Multi-Data Center," published by Oracle Corporation and downloaded from https://docs.oracle.com/en/middleware/idm/access-manager/12.2.1.3/aiaag/synchronizing-data-multi-data-center.html#GUID-B85C3CE2-577B-4C83-A0A1-6E4FE030C579 on Jun. 10, 2021 but dated Jan. 2021, 14 pages.

Wikipedia entry entitled "RSA (cryptosystem)," retrieved from https://en.wikipedia.org/w/index.php?title=RSA_(cryptosystem)&oldid=1070640582, last edited on Feb. 8, 2022 (18 pages).

Wikipedia entry entitled "Distributed File System (Microsoft)," retrieved from https://en.wikipedia.org/w/index.php?title=Distributed_File_System_(Microsoft)&oldid=1049113963, last edited on Oct. 9, 2021 (4 pages).

Wikipedia entry entitled "Microsoft Azure," retrieved from https://en.wikipedia.org/w/index.php?title=Microsoft_Azure&oldid=1069334858, last edited on Feb. 1, 2022 (15 pages).

Wikipedia entry entitled "Data Center," retrieved from https://en.wikipedia.org/w/index.php?title=Data_center&oldid=1061942713, last edited on Dec. 25, 2021 (21 pages).

Wikipedia entry entitled "JSON," retrieved from https://en.wikipedia.org/w/index.php?title=JSON&oldid=1070847316, last edited on Feb. 9, 2022 (11 pages).

Wikipedia entry entitled "SQL," retrieved from https://en.wikipedia.org/w/index.php?title=SQL&oldid=1070408880, last edited on Feb. 7, 2022 (15 pages).

Wikipedia entry entitled "Universally Unique Identifier," retrieved from https://en.wikipedia.org/w/index.php?title=Universally_unique_identifier&oldid=1068569982, last edited on Jan. 29, 2022 (11 pages).

Intellectual Property India, Examination report under sections 12 & 13 of the Patents Act, 1970 and Patent Rules, 2003, in Indian application 202041033562, dispatched Sep. 28, 2022, 6 pages.

\* cited by examiner

METHODS AND SYSTEMS FOR SYNCHRONIZATION IN A CLOUD MARKETPLACE

TECHNICAL FIELD

Embodiments of the present disclosure relate generally to data processing and, more particularly, but not by way of limitation, to methods and systems for synchronizing user feedback within and between distributed and networked data centers of a cloud marketplace.

BACKGROUND

A cloud marketplace (or e-commerce marketplace) is an online store with which users can search and purchase applications, extensions to applications (apps), products, and services. An application or extension to an application is referred to herein as an app and in the plural form as apps. Cloud marketplaces can be maintained on geographically distributed data centers (DCs), each a repository that houses computing facilities like servers, routers, switches and firewalls, as well as supporting components like backup equipment, fire-suppression facilities and air conditioning. Businesses can thus serve global customers by deploying DCs in different regions like the US, the EU, India, China, Australia, etc.

Each data center includes one or more databases that are synchronized across the data centers so that users have access to some of the same data. For example, apps and related information, such as user reviews and software updates, should be equally available from any data center within a cloud marketplace. However, data sharing and transfer regulations such as General Data Protection Regulation (GDPR) and the California Consumer Privacy Act (CCPA) may place restrictions on synchronizing databases. Even if data transfer and sharing are not restricted between databases (e.g. because the data is non-private or the databases are not under data transfer and sharing restrictions) the sharing of data may not always be available in real-time to meet or serve customer needs in a timely fashion. Data expressing apps, updates, and reviews should be synchronized preferably in real-time across a cloud marketplace while complying with the regulations. There is therefore a need for methods and systems for synchronizing data across a cloud marketplace.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An e-commerce marketplace framework has been developed to synchronize app metadata (data about apps) across data centers (DCs) within an e-commerce marketplace. The e-commerce marketplace framework is, in one embodiment, built on an Asynchronous Web Server Framework (AWSF) of Zoho Corporation Pvt. Ltd. The AWSF provides a NIO-based HTTP Server with GET/POST support along with streaming of data (NIO stands for Non-blocking Input/Output). This framework supports heavy file uploads/downloads and both HTTPS and web socket protocols. The framework can handle asynchronous data flow across communication networks interconnecting the DCs.

Figure 1:
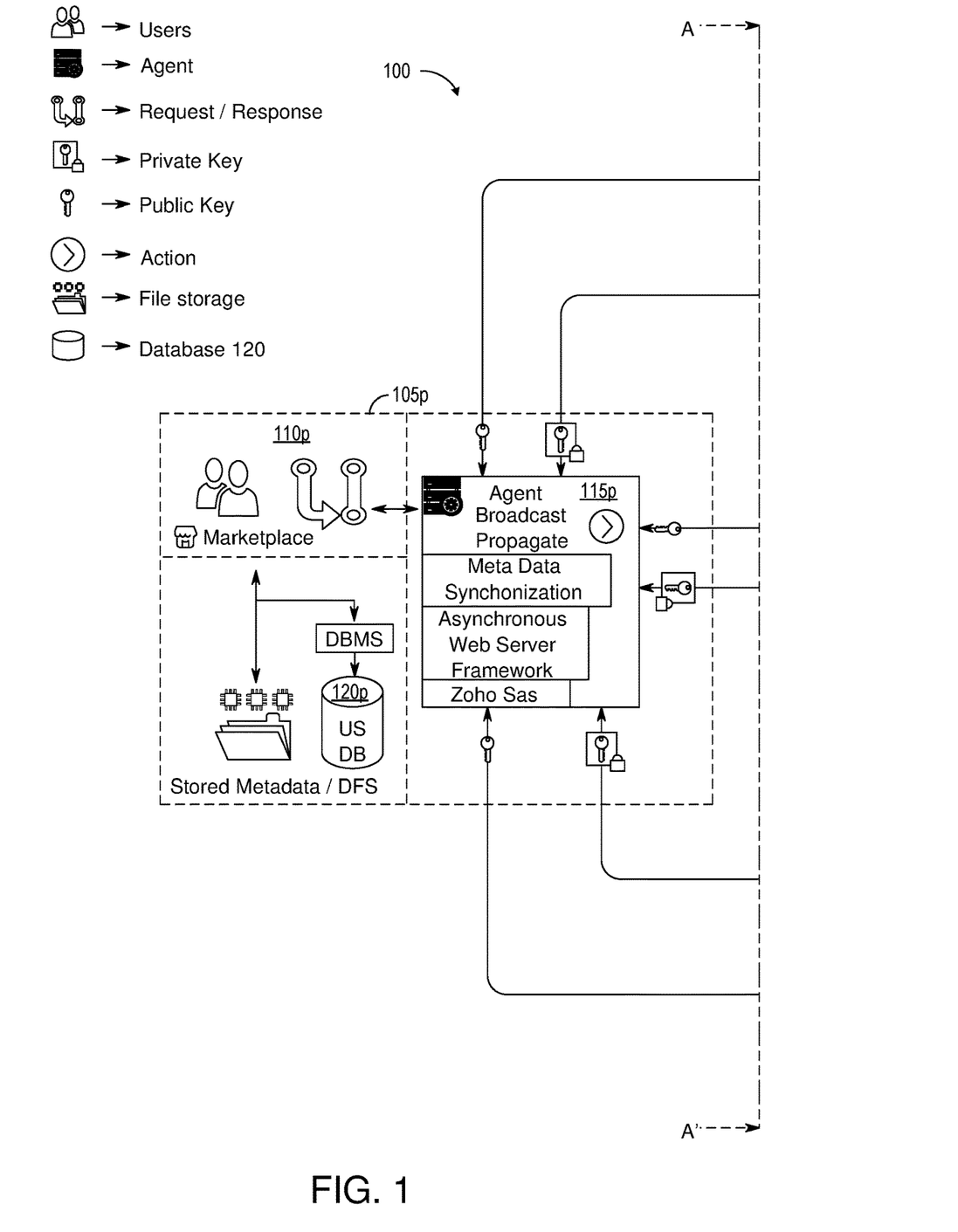
FIG. 1 depicts an architecture for asynchronous data synchronization across marketplace data centers.

FIG. 1 represents an implementation of a framework 100 that supports the synchronization of marketplace apps details across multiple marketplace DCs 105. A key at upper left identifies symbols that illustrate network features and functions for storing and communicating information. There are multiple DCs 105 in different locations to service user requests across the globe, a primary DC 105*p* in the US, at left in FIG. 1, and secondary DCs 105*s* in Europe (EU DC), China (CN DC), and India (IN DC). The "p" for "primary" and "s" for secondary are used throughout to distinguish elements associated with primary and secondary DCs 105*p* and 105*s*. A user, interacting with any of DCs 105 to download or interact with an app, might request to leave a review of the app. Reviews and ratings are treated as app metadata in association with the respective app and distributed across DCs 105 to be made available to global users of the e-commerce marketplace represented by framework 100.

Each DC 105, primary or secondary, includes a marketplace module 110 that employs a software agent 115, or "agent module," for synchronization of e.g. app metadata in real-time or near real-time to meet customer needs in a timely manner. In this context, a software agent, or just "agent," is a computer program or program module that acts on behalf of another program or module in a relationship of agency. Software agents can transfer data between DCs 105 as needed. A module is a portion of a computer program that encapsulates code and data to implement a particular functionality in service of the larger program. A module has a logical interface that conveys messages to and from other modules.

Each marketplace DC 105 also includes computing resources to execute programs or program modules. In one scenario each marketplace DC 105 includes a server with one or more processors (hereafter just "processor") with access to memory running an operating system (OS) that supports the server's basic functions, such as the scheduling of tasks, executing programs, and controlling peripherals. Programs or program modules execute on the computing resources of the local marketplace DC 105. The OS can allocate logical address spaces in main memory to different programs or program modules executing on the processor or processors. In the example of FIG. 1, for each DC 105 a marketplace module 110 executing on a local processor or processors is allocated first logical addresses in main memory, while an agent module 115 is allocated second logical addresses distinct from the first. In another scenario a marketplace module 110 and its agent module 115 may execute on different server or host machines, in which case they may be allocated different physical address spaces and therefore execute in different physical address spaces. Each DC 105 also includes a database (DB) 120 with a database management system (DBMS) coupled to the associated marketplace module 110. The DBMS, using well-known DBMS protocols, allows the marketplace module 110 to communicate with the local database 120 and manages synchronization of the collection of databases 120 across the distributed network of DCs 105. Each database 120 may be physically remote from the computing resources employed in executing the corresponding agent module 115 and employ storage that is orders of magnitude slower than main memory. DBMS scheduling further reduces the relative speed performance of each database 120. Communication and synchronization of data between marketplace modules 110 via corresponding agent modules 115 can thus be much faster and more efficient than via corresponding databases 120.

Users of a marketplace DC 105 include product developers, sellers, and buyers. Developers and sellers can upload product descriptions and other product metadata. Buyers, e.g. via an Internet connection, can peruse product offerings (e.g. items for sale or apps on offer via the marketplace data centers 105). Buyers interact with one of the marketplace modules 110 to purchase products and can read and submit feedback for distribution and storage as additional product metadata. This form of metadata is for publication and so can be synchronized among DCs 105 without consideration of privacy restrictions that may be in place for other information stored in databases 120. The marketplace module 110 in one DC 105 can share product metadata with other DCs 105 in real-time (or near real-time) via the corresponding agent module 115 without having to involve the local DBMS or wait for the DBMS to perform its relatively slow and delayed synchronization process. Each agent module 115 supports fast, efficient, and asynchronous data flow using the software framework noted previously. The inclusion of agent modules 115 in the various DCs 105 thus makes product metadata, such as user reviews, rapidly available to users across the network of DCs 105.

An agent module 115 of a particular DC 105 can receive requests from the co-located marketplace module 110, or from an agent 115 of other DCs 105. In the embodiment of FIG. 1, user metadata directed to primary DC 105$p$ is handled by primary agent 115$p$, which messages the metadata to secondary DCs 105$s$ and ensures those secondary DCs 105 report successful reception of the updates. User metadata directed to one of secondary DCs 105$s$ is handled by that secondary DC 105$s$. In one embodiment, the recipient secondary DC 105$s$ sends the metadata to primary DC 105$p$, which then manages synchronization with the remaining secondary DCs 105$s$.

User requests from different regions will reach agents 115 of the respective DCs 105 through their respective marketplace modules 110. Primary agent 115$p$ performs either a propagation or broadcast of data (e.g. app metadata) based on the source of the request. Each secondary agent 115$s$ receives the data and also notifies primary agent 115$p$. These functionalities of agents 115 help in the synchronization of metadata across DCs 105 in real-time or near real-time (for example when there are network transmission delays) to meet/serve customer needs in a timely manner. The flows of metadata across DCs 105 for synchronization can be secured using an RSA encrypted MD5 hash of the metadata. In some scenarios, for faster and more efficient data transfer, an agent 115 in coordination with its marketplace module 110 may directly access an associated DBMS/database or distributed file system (DFS).

The agent module in each DC can be implemented as a service in Zoho Marketplace grid. The details of each app that is listed in Zoho Marketplace persist in the structured data format and any file related to it persists in unstructured data format in all the DCs. The information about each app available in one DC should be available in all DCs.

The location where a given agent module 115 is deployed can determine the roles and actions associated with the agent. In framework 100, primary agent module 115$p$ supports the following actions:

Receives data related to users as well as user events from marketplace module 110$p$.

Forwards app metadata to marketplace module 110$p$, though in one embodiment this step may await reports of successful completion from secondary agents 115$s$.

Checks the source of app metadata and:
If from marketplace module 110$p$ (of primary DC 105$p$), then primary agent 115$p$ initiates a metadata broadcast to secondary DCs 105$s$.
If from a marketplace module 110$s$ (of one of the secondary DCs 105$s$), then primary agent 115$p$ initiates a metadata broadcast to all secondary DCs 105$s$ except the one from which the metadata arrived.

There can be more than one secondary agent, the number generally depending upon the number of DCs 105. Secondary agents 115$s$ receive metadata from local users, transfer such received metadata to primary agent 115$p$, and receive metadata updates from primary agent 115$p$. In framework 100, secondary agents 115$s$ support the following functionalities.

Receive data related to users as well as events from the marketplace module 110$s$ of the respective secondary DC 105$s$.

The details about a user's event will be treated as metadata and the metadata will be messaged to primary agent 115$p$.

Receive and store app metadata when primary agent 115$p$ performs propagation.

Figure 2:
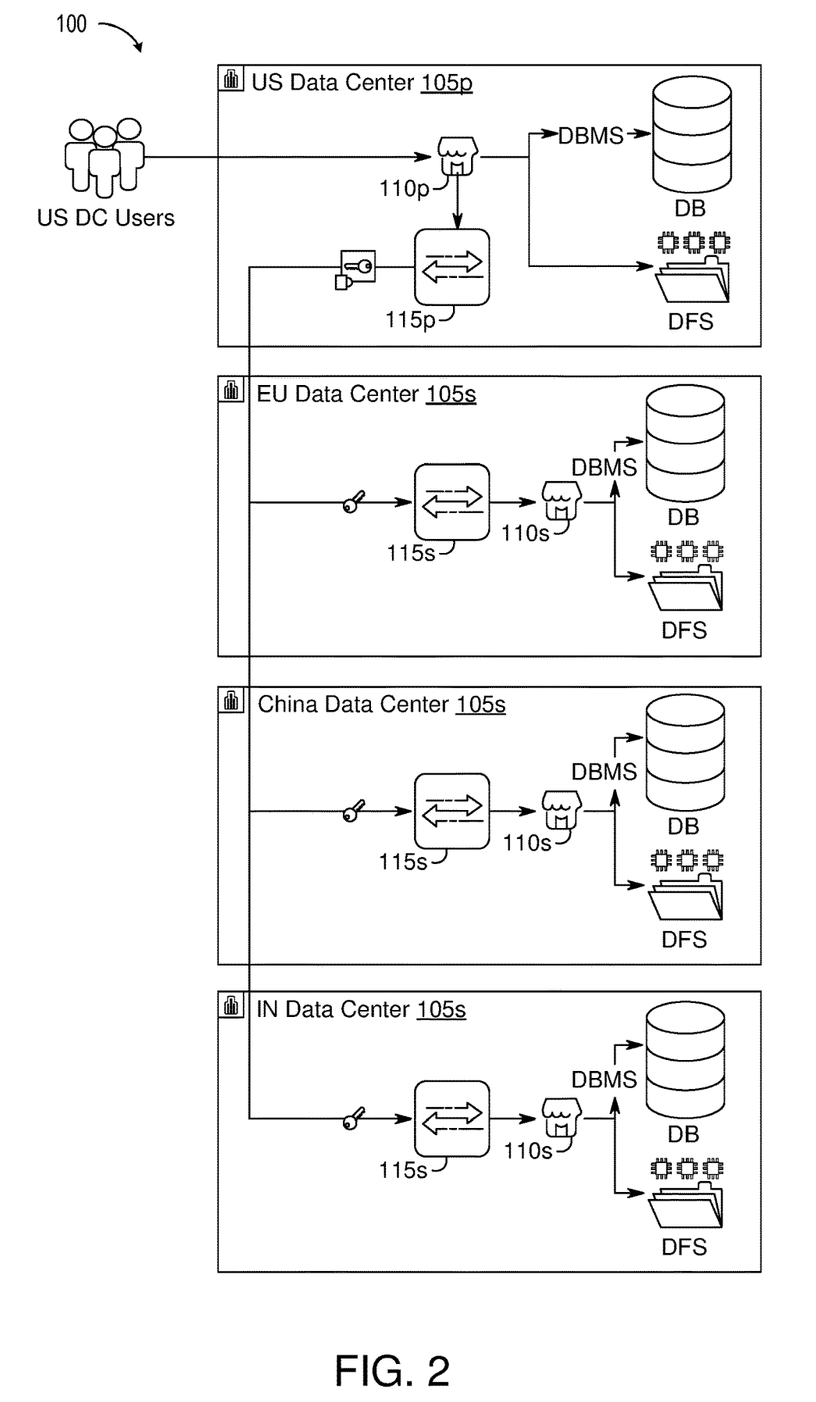
FIG. 2 depicts information flow for a broadcast user request from a primary data center to secondary data centers.

FIG. 2 depicts framework 100, including the same four DCs 105, to illustrate metadata broadcast functionality of primary DC 105$p$ in accordance with one embodiment. Once a request with app metadata is made by a user in a region served by primary DC 105$p$, primary agent 115$p$ initiates a broadcast of the metadata to secondary DCs 105$s$ as an https/host request. Primary agent 115$p$ uses a private key to encrypt the metadata, creates a message with the encrypted metadata as payload, and sends the message to secondary agents 115$s$. Each secondary agent 115$s$ uses a public key to decrypt the metadata and forwards the metadata to the marketplace module in a respective secondary DC. Successful decryption is part of a handshake that authenticates messages and verifies message sources.

Secondary agents 115$s$ can be updated sequentially, in parallel, or in a combination of the two. In some embodiments, secondary agents 115$s$ are arranged in a daisy-chain configuration, with each passing on a message to the next in some preset or communicated order. Messages reporting success or failure can similarly be communicated back to primary agent 115$p$ in various ways.

Successive requests with metadata for update are queued and processed sequentially to ensure synchronization across all DCs 105. The agent 115, primary or secondary, that first receives app metadata from a user assigns a unique identifier (UID) to the metadata. The assigned UID is generated based on time stamp, date, and marketplace-specific code assigned within the e-commerce marketplace. For example, a marketplace data center number/identifier can be assigned to a given marketplace DC 105 to identify and differentiate it from other marketplace data centers. The UID that is assigned to metadata allows the agent modules collectively to distinguish metadata updates. A UID accompanies each instance of metadata communications.

Figure 3:
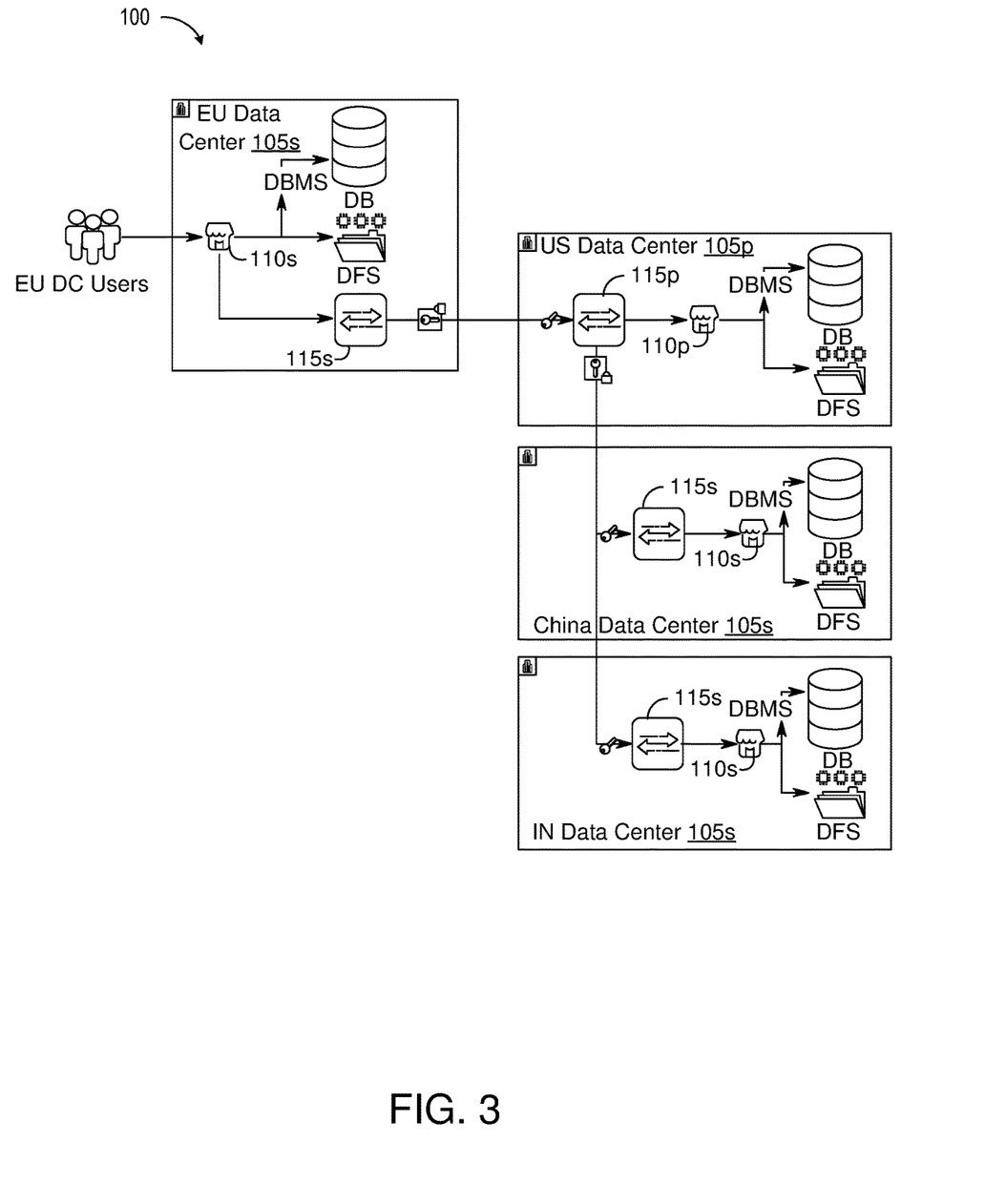
FIG. 3 depicts information flow for a broadcast user request from a secondary data center to a primary data center for broadcast to the remaining secondary data centers.

FIG. 3 depicts framework 100, including the same primary and secondary DCs 105p and 105s, to illustrate the flow of metadata when a user event is reported from a region served by one of secondary DCs 105s, a European DC in this example. Secondary agent 115s of the EU DC 105s generates and conveys an encrypted message notifying primary agent 115p about the event. Primary agent 115p decrypts the data using the public key to obtain the message payload (e.g. app metadata). Primary agent 115p also initiates a propagation process to synchronize with secondary DCs 115s.

Figure 4:
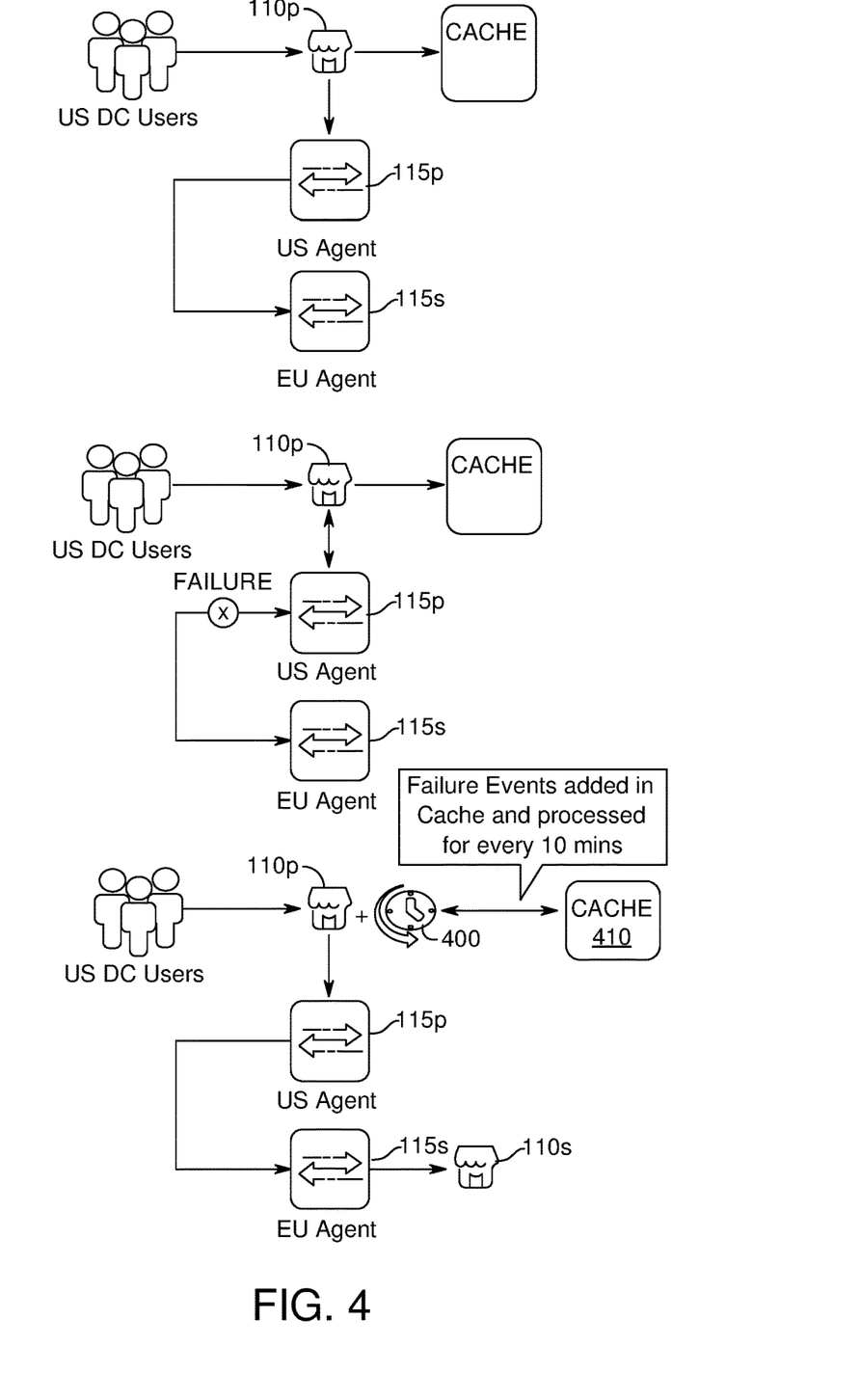
FIG. 4 is a flowchart depicting an example of how failure events are handled.

FIG. 4 illustrates how primary agent 115p verifies synchronization with a secondary agent 115s and handles failure events. Messages that reach primary agent 115p, e.g. via marketplace 110p, are queued before they are acted upon. When a failure occurs during the synchronization process, the failed event is captured and cached in primary DC 105p. A scheduler 400 in e.g. marketplace module fetches the details of failed events from a local cache 410 e.g. every 10 minutes and retries synchronization until data integrity is confirmed.

Example: User rating provided for an app.

Figure 5:
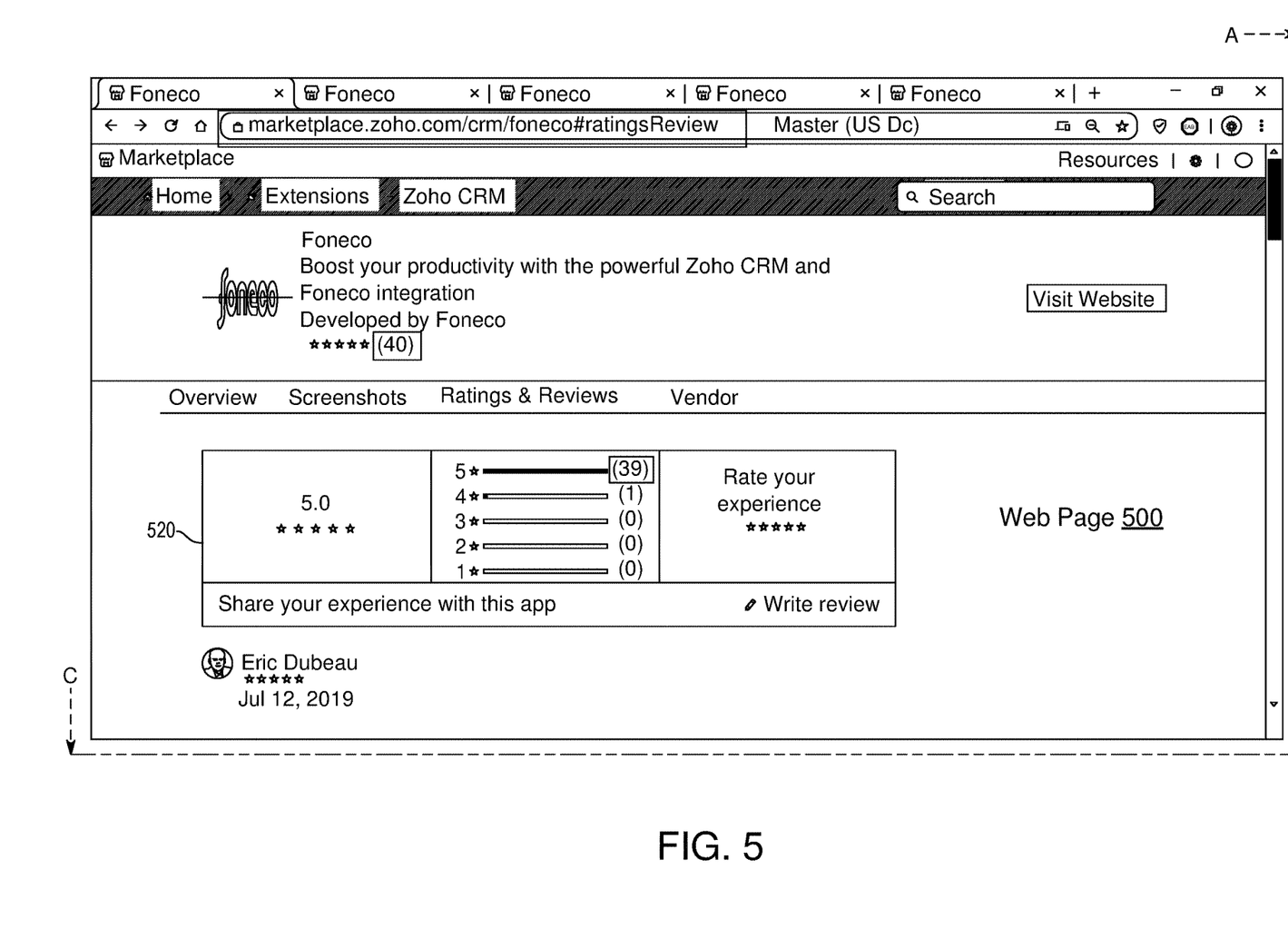
FIG. 5 depicts web pages summarizing ratings and reviews, and seeking user feedback for four geographically distinct data centers, a master (primary) data center in the US and four secondary data centers in each of China, Europe, and India.

FIG. 5 depicts four web pages 500, 505, 510, and 515 summarizing ratings and reviews, and seeking user feedback for four respective and geographically distinct DCs, page 500 a user interface for a master (primary) DC in the US and pages 505, 510, and 515 user interfaces for three respective secondary DCs in each of China, Europe, and India. A user provides a rating and a review for an app (e.g. a four-star rating and a comment relating to a browser plug-in) available in a cloud marketplace distributed across multiple DCs. This user feedback is received via one DC but is made available to other users via all DCs so that it impacts in ratings and rating statistics 520 that appear on each of pages 500, 505, 510, and 515.

Figure 6:
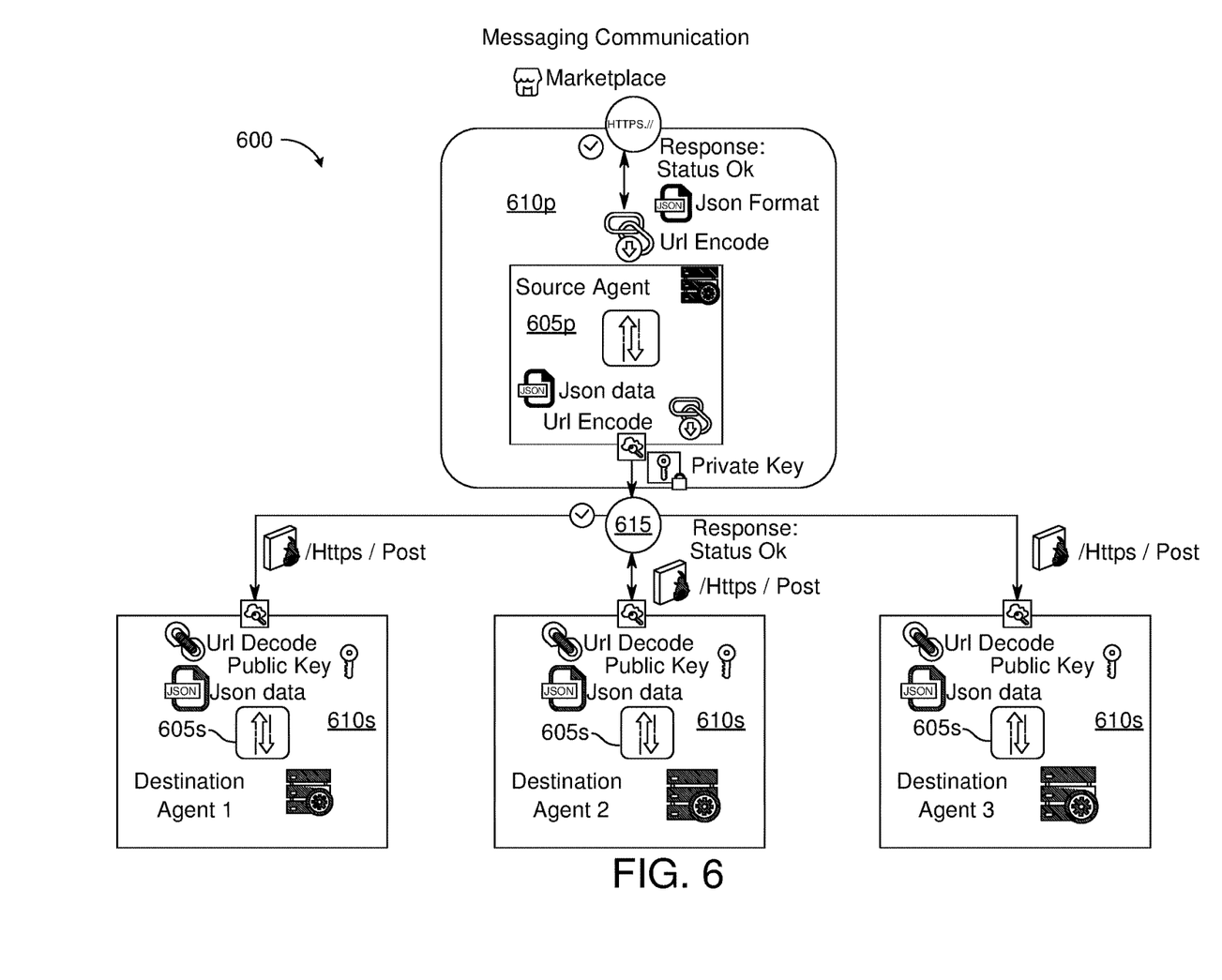
FIG. 6 graphically depicts a cloud marketplace with a source agent of a primary data center connected to destination agents of secondary data centers via a network (e.g., the Internet) that employs the hypertext transfer protocol (HTTP) and public-key/private-key data security.

FIG. 6 graphically depicts a cloud marketplace 600 with a source agent 605p of a primary DC 610p connected to destination agents of secondary DCs 610s via a network 615 (e.g., the Internet) that employs the hypertext transfer protocol (HTTP) and public-key/private-key data security. User requests that update metadata can be conveyed to and between DCs 610 as URL-encoded Hypertext Transfer Protocol Secure (HTTPS) messages with metadata payloads formatted in JavaScript Object Notation (JSON). HTTPS is an extension of HTTP commonly used for secure communications over the Internet. The JSON format is commonly used for serializing and transmitting structured data over a network connection.

In general, the receiving agent 605 decides how to manage a given request. As the request is received at the primary DC 610p, primary agent 605p broadcasts the metadata of the request to secondary agents 605s via network 615. To perform a secured data flow, the primary agent 605p encrypts the metadata before broadcasting the encrypted JSON-format metadata to the secondary DCs 610s. The secondary DCs 610s parse their respective messages from the primary DC 610p and decrypt the message payload to obtain the JSON-formatted metadata. Typically, image files are fetched by the marketplace modules from the respective DFS servers present in each DC 610.

If a request for a metadata update arrives via a secondary DC 610s, then the respective secondary agent 605s messages the primary agent 605p, which in turn broadcasts messages to the remaining secondary agents 605s. In this example, the secondary EU DC 610s, the middle of the three DCs 610s at bottom, messages primary US DC 610p, at top, encrypted metadata. Primary agent 605p decrypts the metadata and propagates the encrypted metadata to the remaining secondary DCs (all but the EU DC). If a request fails while syncing to another DC, the failure event is captured and stored in cache for scheduled reprocessing via the associated agents. Primary DC 610p can also assume failure for a secondary DC 610s until receipt of a message indicative of success.

Figure 7:
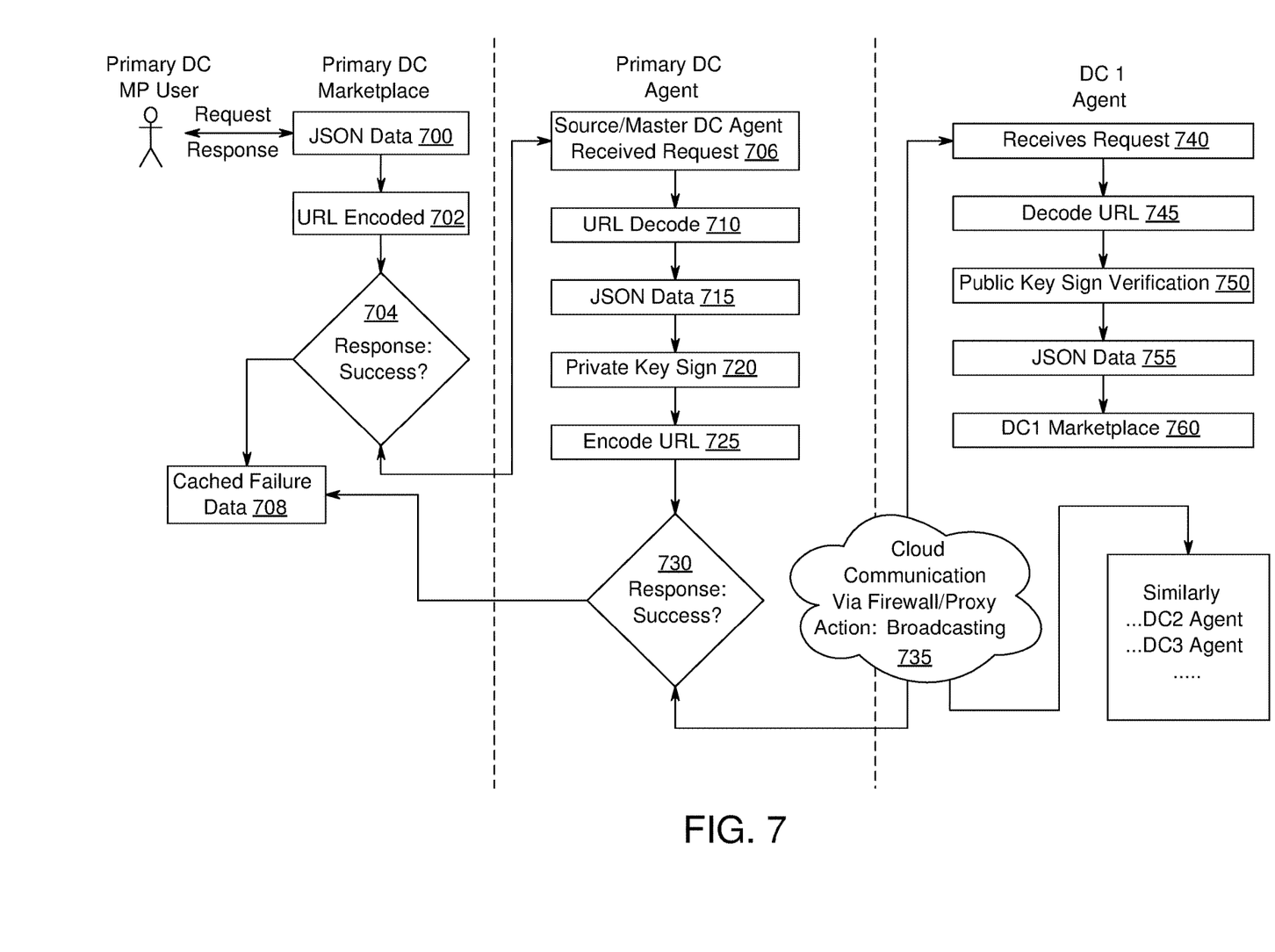
FIG. 7 is a diagram depicting data flow for user requests broadcast to DCs within a cloud marketplace.

FIG. 7 is a diagram depicting data flow for user requests broadcast to DCs within a cloud marketplace. A user interacting with a primary DC requests an update to be made to the metadata, the update comprising data 700 communicated in JSON format. The metadata is encrypted and URL encoded in the primary DC marketplace (702) before being sent to the primary DC agent. This action is depicted as a decision 704 because the primary DC marketplace awaits a response 706 from the DC agent reporting successful message communication or otherwise caches the data that failed to send (708) for a subsequent attempt. URL encoding is a well-known mechanism for encoding information in a Uniform Resource Identifier (URI).

The URL-encoded message received by the primary agent is decoded (710) and the JSON data extracted (715) at the primary DC agent. Either or both of the decoding and storing can be delayed until the primary agent receives confirmation of a successful update from all of the secondary agents. If the message payload has been decoded, the primary agent can sign (720), re-encode (725), and broadcast the message (730). When broadcast, the message is stored locally in a message queue awaiting reported success from the secondary DCs.

Communication infrastructure for broadcasting, including network components, is depicted as a cloud 735. The action of directing the message to a first DC agent is depicted as a decision 730 because the primary DC agent awaits a response from each of the DC agents reporting successful message communication before reporting success to the primary DC marketplace. Taking just one DC agent (DC1 Agent) for illustrative purposes, the agent received the message seeking a metadata update (740), decodes the URL associated therewith (745), verifies message authenticity via a public/private key process (750), recovers the JSON data from the message (755), and updates the database associated with the local DC1 marketplace (760). The broadcast message should reach all the secondary DC agents, other than a secondary agent that is the source of initial message. When all of the secondary agents signal success, the primary DC removes that entry from the message queue. Data-integrity checks can be performed periodically to verify that the metadata matches among the distributed DCs.

Figure 8:
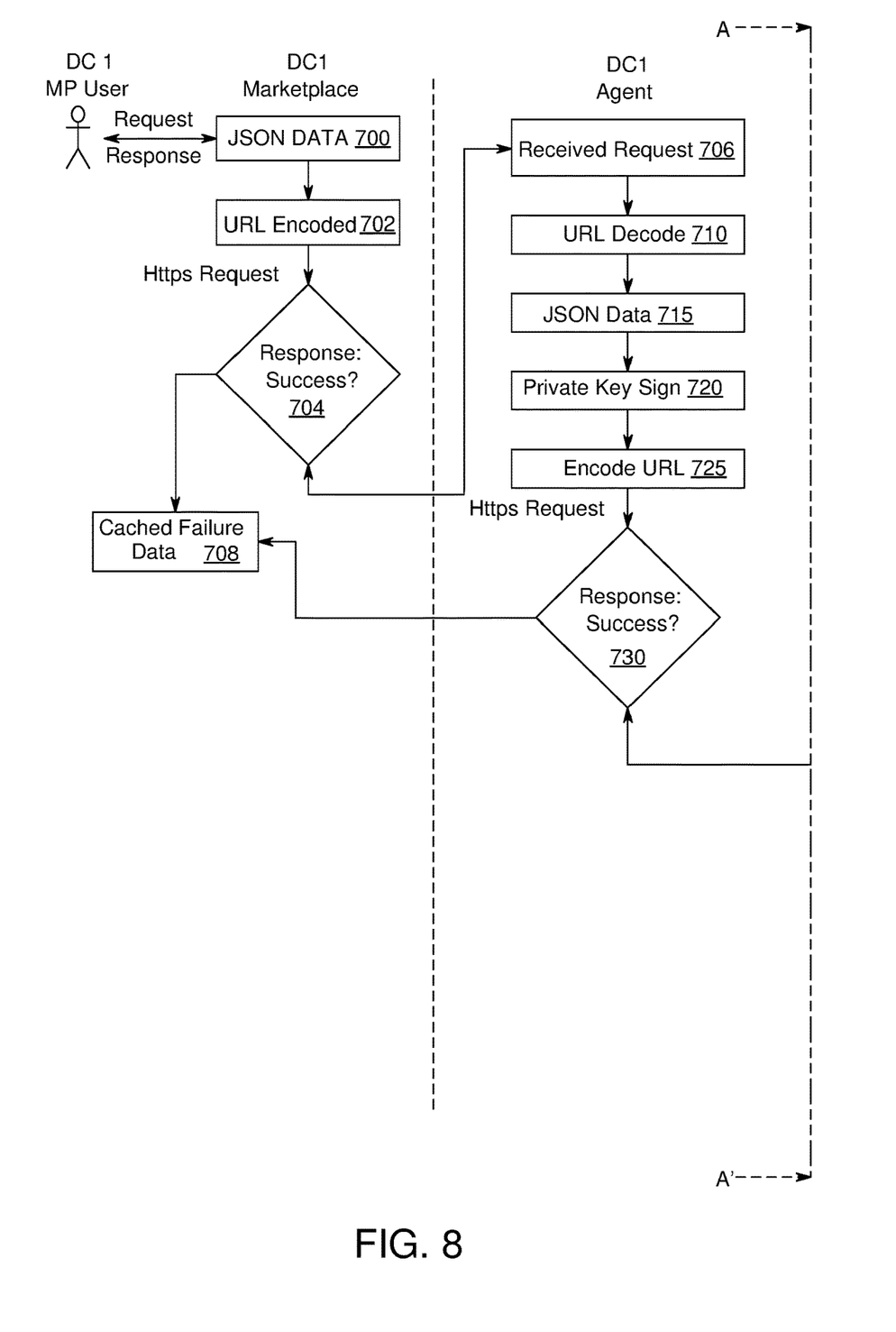
FIG. 8 is a diagram depicting data flow for user requests conveyed from a secondary DC to a primary DC for distribution.

FIG. 8 is a diagram depicting data flow for user requests and messages conveyed between a primary DC agent and a collection of secondary DC agents, including secondary DC agents DC1 and DC2. The steps are similar to those of FIG. 7, with like-labeled elements being the same or similar, for updates based on interactions with the DC1 marketplace.

Likewise, a user interacting with secondary DC2 can issue a request that updates metadata. Secondary agent DC2 encrypts and encodes the message before propagating the message to the primary DC agent via e.g. cloud communication. The primary DC agent decrypts and decodes the message and notifies the primary DC marketplace to update. Once the primary DC marketplace is updated, the message is again encrypted, encoded, and broadcast to the remaining secondary DC agents as detailed previously until all the DCs, primary and secondary, are updated to include the new metadata. The secondary DC2 that initiated the metadata update can perform the update locally before or after awaiting direction from the primary DC agent.

Variations of these embodiments, and variations in usage of these embodiments, including separate or combined embodiments in which features are used separately or in any combination, will be obvious to those of ordinary skill in the art. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A method of synchronizing product data descriptive of products among a network of marketplace data centers, including a first data center and a second data center, the method comprising:
    maintaining, in a first database associated within the first data center, the product data descriptive of the products;
    offering the products and publishing the product data from the first data center;
    receiving, at the first data center, user feedback related to one of the products;
    storing the user feedback in a cache in the first data center;
    updating the product data descriptive of the products in the first database to include the user feedback, the updating using database-management-system protocols that store the product data, including the user feedback, in the first database;
    forwarding the user feedback related to the one of the products from the cache of the first data center to the second data center;
    publishing the product data, including the user feedback related to the one of the products, from the second data center; and
    after the publishing of the user feedback related to the one of the products from the second data center, communicating with a second database associated with the second data center to synchronize the product data, including the user feedback, in the first database with the second database.

2. The method of claim 1, further comprising maintaining an agent module in the first data center to receive and forward the user feedback.

3. The method of claim 1, further comprising publishing the user feedback via the first data center before the updating of the product data in the first database to include the user feedback.

4. The method of claim 1, further comprising publishing the user feedback via the first data center before communicating with the second database to synchronize the user feedback.

5. The method of claim 1, further comprising storing the user feedback in a message queue; receiving a signal from the second data center indicating successful receipt of the user feedback; and deleting the user feedback from the message queue responsive to the signal.

6. The method of claim 1, further comprising:
    receiving second user feedback related to the products at the first data center;
    storing the second user feedback in a message queue;
    sending the second user feedback from the first data center to the other data centers, including the second data center;
    awaiting messages of reported success from the other data centers; and
    removing the stored second user feedback from the message queue.

7. The method of claim 6, further comprising, after sending the second user feedback to the other data centers, updating the product data with the second user feedback in the first database.

8. The method of claim 7, further comprising:
    receiving third user feedback related to the products at the second data center;
    forwarding the third user feedback to the first data center; and
    forwarding the third user feedback from the first data center to each of the other data centers other than the second data center.

9. The method of claim 8, further comprising forwarding the third user feedback from the first data center to each of the other data centers but for the second data center.

10. The method of claim 8, further comprising, after forwarding the third user feedback to the other data centers, updating the product data with the third user feedback in the first database.

11. The method of claim 1, further comprising, after forwarding the user feedback to the second data center, verifying whether the user feedback synchronized between the first and second data centers.

12. The method of claim 11, wherein the verifying elicits a failure event, the method further comprising caching the failed event in the first data center and retrying the verifying.

13. A marketplace data center to offer products and publish product data descriptive of the products among a network of data centers, including the marketplace data center and a remote data center, the marketplace data center comprising:
    computing resources with access to memory;
    a marketplace module executing on the computing resources with the memory and having access to a database storing the product data descriptive of the products, the marketplace module to offer the products and publish the product data;
    an agent module executing on the computing resources with the memory, the agent module to receive user feedback related to one of the products and store the user feedback in a cache and convey the user feedback to the database, the agent module to forward the user feedback related to the one of the products from the cache to the remote data center; and
    a database management system to manage the database, the database management system to begin to synchronize the product data, including the user feedback, in the database with the remote data center after the agent module forwards the user feedback to the remote data center.

14. The marketplace data center of claim 13, wherein the marketplace module is communicatively coupled to the agent module and the database management system.

15. The marketplace data center of claim 13, the marketplace module further to publish the user feedback before the database management system updates the database to include the user feedback.

16. The marketplace data center of claim 13, the marketplace module further to publish the user feedback before the database management system synchronizes the product data, including the user feedback, with the remote data center.

17. The marketplace data center of claim 13, the agent module further to store the user feedback in a message queue; receive a signal from the remote data center indicating successful receipt of the user feedback; and delete the user feedback from the message queue responsive to the signal.

18. The marketplace data center of claim 13, the agent module further to:
  receive second user feedback related to the products at the marketplace data center;
  store the second user feedback in a message queue;
  send the second user feedback from the marketplace data center to the other data centers, including the remote data center;
  await messages of reported success from the other data centers; and
  remove the stored second user feedback from the message queue.

19. The marketplace data center of claim 18, the agent module further to update the product data with the second user feedback in the database after sending the second user feedback to the other data centers.

20. A marketplace data center to offer products and publish product data descriptive of the products among a network of data centers, including the marketplace data center and a remote data center, the marketplace data center comprising:
  computing resources with access to memory;
  a marketplace module executing on the computing resources with the memory and having access to a database storing the product data descriptive of the products, the marketplace module to offer the products and publish the product data; and
  means for forwarding user feedback related to one of the products to the remote data center, storing the user feedback in a database, and begin synchronizing the database, including the user feedback, with the remote data center after forwarding the user feedback to the remote data center.

* * * * *